United States Patent
Son et al.

(10) Patent No.: US 8,817,920 B2
(45) Date of Patent: Aug. 26, 2014

(54) APPARATUS AND METHOD FOR DETECTING SIGNAL IN WIRELESS COMMUNICATION SYSTEM

(75) Inventors: Jung-Bo Son, Daejeon (KR); Eun-Young Choi, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 307 days.

(21) Appl. No.: 12/965,282

(22) Filed: Dec. 10, 2010

(65) Prior Publication Data

US 2011/0150148 A1 Jun. 23, 2011

(30) Foreign Application Priority Data

Dec. 18, 2009 (KR) .................. 10-2009-0127306
Apr. 20, 2010 (KR) .................. 10-2010-0036196

(51) Int. Cl.
*H04L 27/06* (2006.01)
(52) U.S. Cl.
USPC .......................................... 375/343; 375/346
(58) Field of Classification Search
USPC .................. 375/260, 340, 343, 346
See application file for complete search history.

(56) References Cited

U.S. PATENT DOCUMENTS

| 5,533,071 | A | 7/1996 | Krishnamurthy et al. |
| 7,474,608 | B2 | 1/2009 | Stephens et al. |
| 7,957,474 | B2 * | 6/2011 | Waters et al. ............. 375/260 |
| 2006/0126545 | A1 * | 6/2006 | Nanda ...................... 370/310 |
| 2007/0064735 | A1 * | 3/2007 | Hoo et al. ................ 370/468 |
| 2007/0242768 | A1 * | 10/2007 | Wallace et al. ........... 375/260 |
| 2009/0122694 | A1 * | 5/2009 | Stephens et al. .......... 370/210 |
| 2010/0111230 | A1 * | 5/2010 | Lee et al. ................ 375/322 |
| 2010/0203828 | A1 * | 8/2010 | Zheng ..................... 455/12.1 |

* cited by examiner

*Primary Examiner* — Shuwang Liu
*Assistant Examiner* — David S Huang
(74) *Attorney, Agent, or Firm* — Staas & Halsey LLP

(57) ABSTRACT

The apparatus includes a radio frequency (RF) unit configured to arrange a plurality of symbols received through an antenna at a frequency domain, an analog to digital (AD) converter configured to converts the plurality of symbols arranged at the frequency domain to digital symbols, a fast Fourier transform (FFT) unit configured to transform the digital symbols through a fast Fourier transform scheme, a compensator configured to compensate a gain mismatch between an I-channel and a Q-channel of the transformed digital symbols, a mapping unit configured to the compensated digital symbols to a constellation diagram, and a detector configured to correlate the mapped symbols, extract correlation results, and detect a high throughput (HT) signal using the extracted correlation results.

12 Claims, 5 Drawing Sheets

APPARATUS AND METHOD FOR DETECTING SIGNAL IN WIRELESS COMMUNICATION SYSTEM

CROSS-REFERENCES TO RELATED APPLICATIONS

The present application claims priority of Korean Patent Application Nos. 10-2009-0127306 and 10-2010-0036196, filed on Dec. 18, 2009, and Apr. 20, 2010, respectively, which are incorporated herein by reference in their entirety.

BACKGROUND OF THE INVENTION

1. Field of the Invention

Exemplary embodiments of the present invention relate to a wireless communication system; and, more particularly, to an apparatus and method for detecting a signal using correlation between orthogonal frequency division multiplexing (OFDM) symbols in a wireless communication system.

2. Description of Related Art

As an international standard for a wireless network, IEEE 802.11 has been introduced. Here, IEEE stands for the Institute of Electrical and Electronics Engineers. For example, IEEE 802.11a/g is a standard specification for a wireless local area network (LAN). IEEE 802.11a/g applies an orthogonal frequency division multiplexing (OFDM) modulation scheme as one of multi-carrier schemes. IEEE 802.11a/g supports a maximum data transmit rate of about 54 Mbps. However, a further higher data transmit rate has been required due to increasing demand for mess amount data.

In order to improve the data transmit rate, IEEE 802.11n has been developed as an extended standard of IEEE 802.11a/g. IEEE 802.11n applies an OFDM modulation scheme to a multiple-input multiple-output (MIMO) system.

The MIMO system includes a transmitter having a plurality of antennas and a receiver having a plurality of antennas. The MIMO system provides a high data transmit rate and improved bandwidth efficiency in a multi-path fading wireless channel environment using spatial-multiplexed multiple spatial streams. Further, IEEE 802.11n realizes high throughput (HT) by applying a modulation and coding scheme different from that of IEEE 802.11a/g.

IEEE 802.11n applies a new structured preamble having orthogonality for MIMO-OFDM time synchronization. Due to the new structured preamble, IEEE 802.11n cannot provide comparability with existing IEEE 802.11a/g WLNA equipment. In order to provide the comparability to the existing equipment, IEEE 802.11n draft standard provides three modes and defines different preambles for each mode.

Particularly, IEEE 802.11n draft standard introduced a Non-HT mode, a HT mixed mode, and a HT Greenfield mode. The Non-HT mode is identical to an existing preamble of a WLAN. That is, the Non-HT mode is a legacy mode and its preamble is a legacy preamble. The HT mixed mode is combination of the legacy preamble and a HT preamble. The HT Greenfield mode is for a high data transmit rate.

In the HT mixed mode, a packet includes a header formed of a legacy preamble and a HT preamble. Here, the legacy preamble is a preamble having a format introduced in IEEE 802.11a/g and the HT preamble is a new preamble introduced in IEEE 802.11n. Accordingly, such a HT mixed mode enables an IEEE 802.11n terminal to communicate with an IEEE 802.11a/g terminal.

In the HT mixed mode, an IEEE 802.11n transmitter uses a predetermined MCS (Modulation and Coding Scheme) method to inform a receiver of HT transmission. The receiver detects a HT preamble by comparing an I-phase component and a Q-phase component based on a received OFDM signal from the transmitter. However, the receiver may erroneously detect the HT preamble when the HT preamble is detected only based on the I-phase component and Q-phase component. Although a success rate of detecting a HT preamble may be improved by controlling a detection range of the I-phase and Q-phase components, performance thereof significantly decreases when a signal to noise ratio is low.

Therefore, there has been a demand for developing an apparatus and method for detecting a HT preamble according to a modulation scheme in order to overcome the above described problems.

SUMMARY OF THE INVENTION

An embodiment of the present invention is directed to an apparatus and method for detecting a signal in a wireless communication system.

Another embodiment of the present invention is direct to an apparatus and method for detecting a signal using correlation between input OFDM symbols among OFDM symbols in a wireless communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for detecting a signal, includes: a radio frequency (RF) unit configured to arrange a plurality of symbols received through an antenna at a frequency domain; an analog to digital (AD) converter configured to converts the plurality of symbols arranged at the frequency domain to digital symbols; a fast Fourier transform (FFT) unit configured to transform the digital symbols through a fast Fourier transform scheme; a compensator configured to compensate a gain mismatch between an I-channel and a Q-channel of the transformed digital symbols; a mapping unit configured to the compensated digital symbols to a constellation diagram; and a detector configured to correlate the mapped symbols, extract correlation results, and detect a high throughput (HT) signal using the extracted correlation results.

In accordance with an embodiment of the present invention, a method for detecting a signal in a wireless communication system, includes: arranging a plurality of symbols received through an antenna; converting the plurality of arranged symbols to digital symbols; transforming the digital symbols using a fast Fourier transform scheme; compensating a gain mismatch between an I-channel and a Q-channel of the transformed symbols; mapping the compensated symbols to a constellation diagram; and correlating the mapped symbols, extracting correlation results, and detecting a high throughput (HT) signal using the extracted correlation results.

DESCRIPTION OF SPECIFIC EMBODIMENTS

Figure 1:
FIG. 1 illustrates a physical layer protocol data unit (PPDU) frame format introduced in IEEE 802.11n standard.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

The present invention relates to an apparatus and method for detecting a signal in a wireless communication system. Particularly, the present invention relates to an apparatus and method for detecting a signal using correlation between input OFDM symbols among OFDM symbols in a wireless communication system. Before explaining an apparatus and method for detecting a signal in a wireless communication system in accordance with an embodiment of the present invention, a typical signal detection method will be described at first.

FIG. 1 illustrates a physical layer protocol data unit (PPDU) frame format introduced in IEEE 802.11n standard.

Referring to FIG. 1, a PPDU frame format used in a HT mixed mode includes a legacy preamble, a HT format preamble, and data. Here, the legacy preamble includes a L-STF field, a L-LTF field, and a L-SIG field. The HT format preamble includes a HT-SIG1 field, a HT-SIG2 field, a HT-STF field, and a HT-LTF field.

The HT mixed mode of IEEE802.11n is an operation mode for securing comparability with IEEE802.11a/g. The HT mixed mode enables communication with an IEEE 802.11a/g terminal by using a legacy preamble having a format defined in IEEE 802.11a/g and a HT preamble having a format defined in IEEE 802.11n.

The HT mixed mode includes elements of the legacy preamble such as a Legacy Short Training Field (L-STF) 101, a Legacy Long Training Field (L-LTF) 102, and Legacy Signal Field (L-SIG) 103 and elements of the HT preamble such as HT Signal Field (HT-SIG1) 104 and HT-SIG2 105, HT Short Training Field (HT-STF) 106, a HT Long Training Filed (HT-LTF) 107, and HT-DATA 108. As a legacy PPDU frame format introduced in IEEE 802.11a/g, a frame format of a legacy preamble used in an IEEE 802.11n HT mixed mode will be described in detail with reference to FIG. 2.

Figure 2:
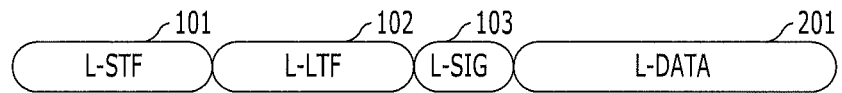
FIG. 2 is a diagram illustrating a PPDU frame format introduced in an IEEE 802.11a/g legacy standard.

FIG. 2 is a diagram illustrating a PPDU frame format introduced in an IEEE 802.11a/g legacy standard. As shown, a legacy preamble used in the HT mixed mode has the same frame format of FIG. 2.

Referring to FIG. 2, a legacy preamble includes a L-STF 101, a L-LTF 102, and a L-SIG 103 with a L-DATA 201 which is a legacy data field. The L-STF 101 is used for finding a packet and for frequency offset and time synchronization. The L-LTF 102 is used for carrier frequency offset and time synchronization and channel estimation. The L-SIG 103 includes information about a rate and length of the L-DATA. As a modulation method of the L-DATA, a Binary Phase Shift Keying (BPSK) scheme, Quadrature Phase Shift Keying (QPSK) scheme, Quadrature Amplitude Modulation (16QAM) scheme, and a 64QAM scheme may be used.

The HT mixed mode additionally includes a HT preamble followed by the legacy preamble shown in FIG. 2. Here, the HT preamble includes a HT-SIG1 104, a HT-SIG2 105, a HT-STF 106, a HT-LTF 107, and a HT-DATA 108. The HT-SIG1 104 and the HT-SIG2 105 includes information for analyzing a HT format such as a MSC applied to a HT payload (PSDU) or a data length of a payload. The HT-STF 106 includes a training symbol to improve auto gain control (AGC) in a MIMO system. The HT-LTF 107 includes a training symbol for channel estimation in a receiver.

Figure 3A:
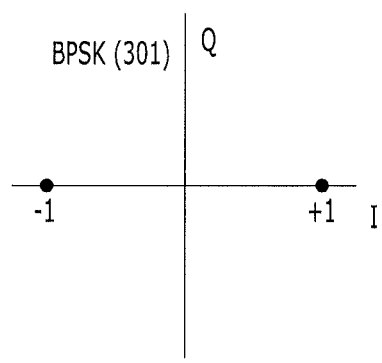
FIGS. 3A and 3B are a diagram illustrating a typical L-SIG modulation method and a typical HT-SIG modulation method.
Figure 3B:
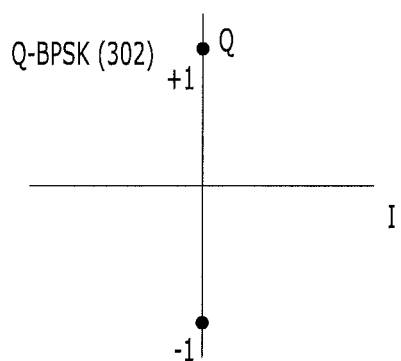

A transmitter transmits data using the HT mixed mode including the legacy preamble and the HT preamble with a transmission method that enables a legacy terminal to decode a signal. Then, a receiver such as the legacy terminal restores a received L-DATA signal using information in the L-SIG such as a L-SIG rate. However, the legacy terminal may lose a received signal if the legacy terminal restores the HT-DATA using a L-DATA demodulation method because the HT-DATA and the L-DATA are modulated through different modulation schemes. In order to inform the legacy terminal of HT signal transmission, the transmitter transmits a HT signal through a Q-BPSK modulation scheme 302 by rotating a phase of a signal about 90 degree in the HT-SIG1 and the HT-SIG2, which was transmitted using a BPSK modulation scheme 301 of FIGS. 3A and 3B in the L-SIG 103. When the receiver such as the legacy terminal detects a HT signal while receiving a signal transmitted from the transmitter, the receiver restores the HT signal using a HT preamble demodulation method from a point of receiving HT-SIGs 103 and 104.

For example, the receiver can detect a HT-SIG field by determining whether phases are orthogonal to each other in the HT-SIG field and the L-SIG field because phases are modulated in the HT-SIG field using a BPSK modulation scheme after rotating the phases about 90 degree from that in the L-SIG field. Further, the receiver determines a signal type such as a legacy signal or a HT signal by comparing I-phase component and Q-phase component of a symbol of the received signal based on a constellation diagram expressing symbols in the received signal.

If a received symbol in a constellation diagram has I-phase component greater than Q-phase component, the receiver determines that the received signal is the HT signal. If not, the receiver determines that the received signal is the legacy signal. However, the receiver may erroneously determine the signal type such as the legacy signal and the HT signal only by comparing I-Phase component and Q-Phase component.

Figure 4:
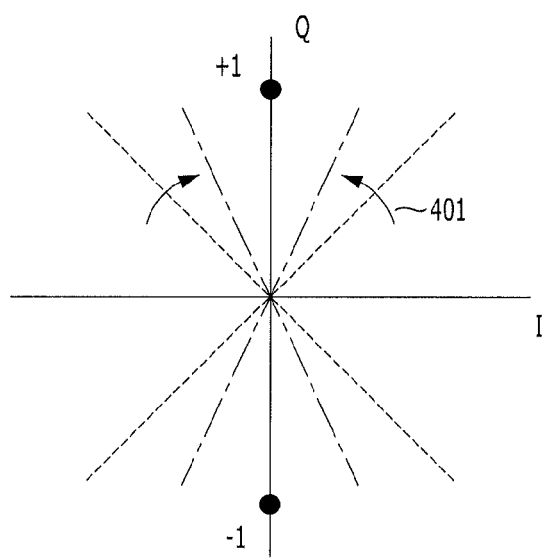
FIG. 4 is a diagram illustrating a Q-BPSK detection method.

Such a detection error can be reduced by reducing a detection threshold boundary 401 shown in FIG. 4. However, it may deteriorate overall system performance. Further, the performance may be deteriorated in a low signal to noise ratio (SNR). Hereinafter, an apparatus for detecting a signal in a wireless communication system in accordance with an embodiment of the present invention will be described in detail with reference to FIG. 5.

Figure 5:
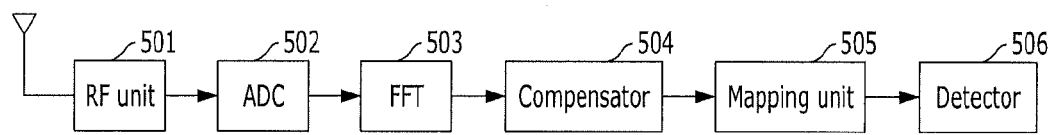
FIG. 5 is a diagram illustrating an apparatus for detecting a signal in a wireless communication system in accordance with an embodiment of the present invention.

FIG. 5 is a diagram illustrating an apparatus for detecting a signal in a wireless communication system in accordance with an embodiment of the present invention.

Referring to FIG. 5, the signal detection apparatus in accordance with an embodiment of the present invention includes a radio frequency (RF) unit 501, an analog to digital converter (ADC) 502, a fast Fourier transform (FFT) unit 503, a compensator 504, a mapping unit 505, and a detector 506. The RF unit 501 arranges a plurality of symbols received through an antenna at a frequency domain. The ADC 502 converts the plurality of symbols arranged at the frequency domain to a digital signal. The FFT unit 503 transforms symbols of the digital signal based on a fast Fourier transform scheme.

The compensator 504 compensates gain mismatches between an I-channel and a Q-channel of the transformed symbols. The mapping unit 505 maps the compensated symbols to a constellation diagram.

The detector 506 correlates the symbols mapped to the constellation diagram, extracts correlation results, and detects a high throughput (HT) signal using the extracted correlation result.

For example, the detector 506 receives the symbols $a_1$, $a_2$, $a_3$, and $a_4$ mapped to the constellation diagram and calculates correlation results of the symbols mapped in the constellation diagram. Using the input data, the detector 506 extracts six correlations such as $(a_1 \times a_2^*)$, $(a_1 \times a_3^*)$, $(a_1 \times a_4^*)$, $(a_2 \times a_3^*)$, $(a_2 \times a_4^*)$, and $(a_3 \times a_4^*)$.

The detector can further accurately detect the HT-signal because the number of correlations increases as the number of input data increases. Among the correlation results, $a_1$ and $a_2$ in $(a_1 \times a_2^*)$ can be expressed as Eq. 1 below.

$$a_1 = |a_1| e^{j\theta_1}$$

$$a_2 = |a_2| e^{j\theta_2} \qquad \text{Eq. 1}$$

In Eq. 1, $j\theta_1$ and $j\theta_2$ denote a phase angle in the constellation diagram, for example, 180° or 0°. The detector 506 calculates the correlation result using Eq. 2 below based on $a_1$ and $a_2$ of Eq. 1.

$$a_1 \times a_2^* = |a_1||a_2| e^{j(\theta_1 - \theta_2)} \qquad \text{Eq. 2}$$

In case of using a Q-BPSK modulation scheme for the HT-SIG fields 104 and 105, a difference of phase angles of Eq. 2, for example, $\theta_1 - \theta_2$ is about 0 or 180. The different of phase angles may be changed according to a signal to noise ratio (SNR). That is, when the detector 506 assumes an amplitude value of the correlation is 1 ($|a_1|$ or $|a_2|=1$), the result of $(a_1 \times a_2^*)$ is about +1 or −1.

The detector 506 detects the HT-SIG based on a threshold value α predetermined using $(a_1 \times a_2^*)$ as shown in Eq. 3 below.

$$|Re\{a_1 \times a_2^*\}| > \alpha \qquad \text{Eq. 3}$$

In Eq. 3, the predetermined threshold value α is $\beta |a_1||a_2|$, and β denotes a weight. That is, the detector 506 detects the HT-SIG field by comparing the predetermined threshold value with a real value of $(a_1 \times a_2^*)$ among the correlations of the input data. However, if only real value is compared, a difference between the Q-BPSK and the BPSK cannot be separated. Accordingly, the detector 506 detects the HT-SIG field using Eq. 4 below.

$$|Im\{a_1\}| > |Re\{a_1\}|$$

$$|Im\{a_2\}| > |Re\{a_2\}| \qquad \text{Eq. 4}$$

In Eq. 4, a real value of $a_1$ included in $(a_1 \times a_2^*)$ is compared with an imaginary value of $a_1$ included $(a_1 \times a_2^*)$. Also, a real value of $a_2$ included in $(a_1 \times a_2^*)$ is compared with an imaginary value of $a_2$ included in $(a_1 \times a_2^*)$ among the correlations of the input data. If the real values of $a_1$ and $a_2$ are greater than the imaginary values thereof as a comparison result, the detector 506 determines input data as HT-SIG. If the real values of $a_1$ and $a_2$ are smaller than the imaginary values thereof as a comparison result, the detector 506 determines input data as L-DATA. That is, the detector 506 confirms reception of a legacy signal.

Hereinafter, a method of detecting HT-SIG using a result of $|Re\{a_n \times a_k^*\}|$ and $|Re\{a_n \times a_k^*\}| > \alpha$ with reference to FIGS. 6 and 7 in detail.

Figure 6:
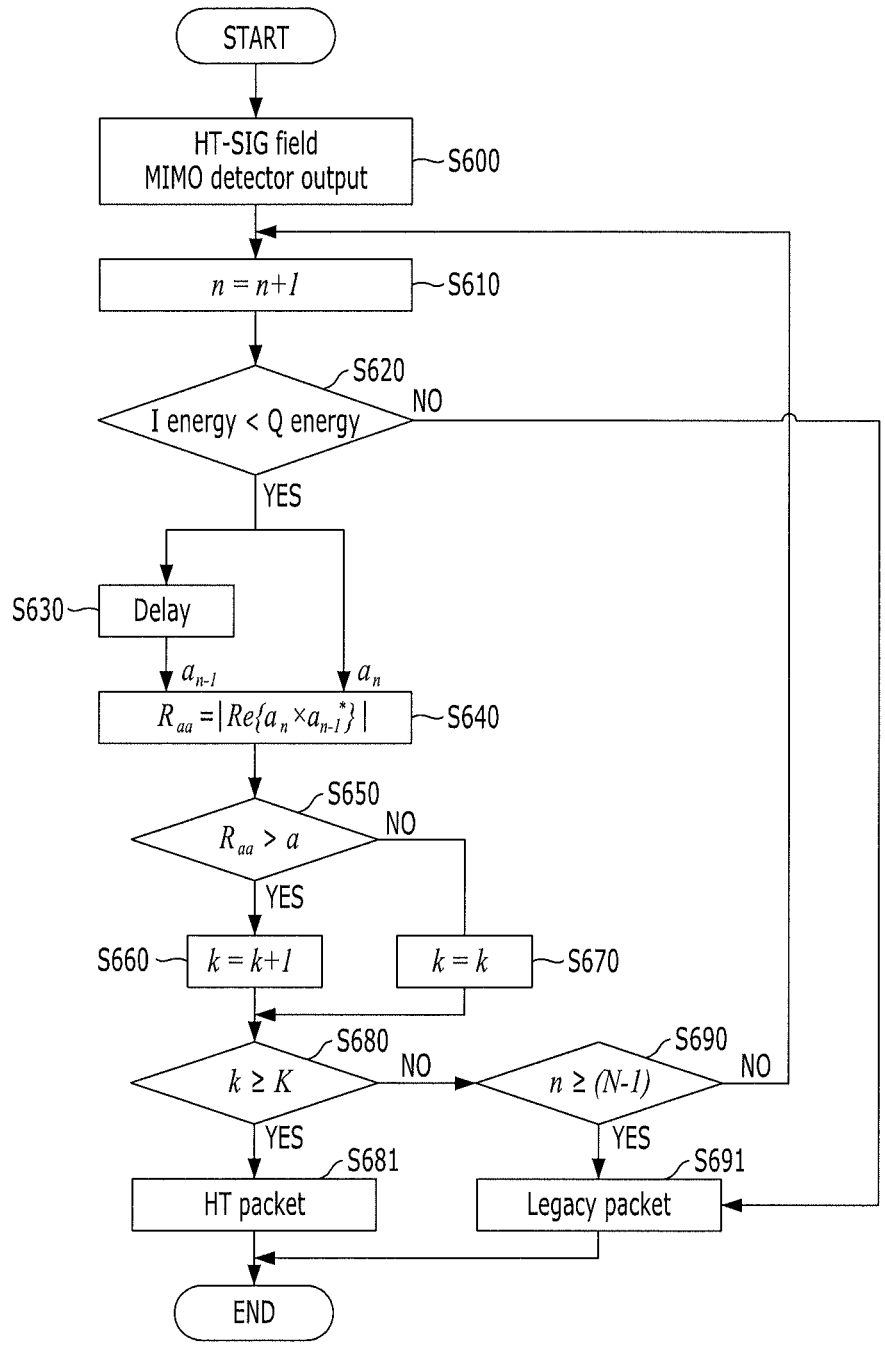
FIG. 6 is a flowchart illustrating a method for detecting HT-SIG by counting a result of $|\text{Re}\{a_n \times a_k^*\}| > \alpha$ in a wireless communication system in accordance with an embodiment of the present invention.

FIG. 6 is a flowchart illustrating a method for detecting HT-SIG by counting a result of $|Re\{a_n \times a_k^*\}| > \alpha$ in a wireless communication system in accordance with an embodiment of the present invention.

Referring to FIG. 6, the detector 506 receives symbols $a_1$, $a_2$, $a_3$, and $a_4$ mapped to a constellation diagram, calculates correlation results between the symbols mapped to the constellation diagram, and detects a HT signal using the calculated correlation results. Herein, the symbols denote predetermined input data among 48 data of OFDM symbols received while HT-SIG is received.

At step S600, the detector increases a variable n for controlling times of calculating correlation of input data. For example, the detector 506 receives input data $a_1$, $a_2$, $a_3$, and $a_4$ from a MIMO detector and calculates correlations of the input data. Using the input data, the detector 506 extracts six correlations $(a_1 \times a_2^*)$, $(a_1 \times a_3^*)$, $(a_1 \times a_4^*)$, $(a_2 \times a_3^*)$, $(a_2 \times a_4^*)$, and $(a_3 \times a_4^*)$. For example, the variable n for controlling the correlation calculating times becomes 6.

At step S610, the detector includes the variable n. At step S620, the detector detects a type of a received signal such as a legacy signal or a HT signal by determining whether a symbol is close to an I-phase or a Q-phase based on a constellation diagram of the symbols of the input data.

If the symbol included in the received signal has I-phase component greater than Q-phase components based on the constellation diagram thereof, the received signal is determined as the HT signal. If not, the received signal is determined as the legacy signal. However, the type of the received signal is detected only based on the I-phase and Q-phase component, the signal type may be erroneously detected.

Therefore, the detector 506 delays the input data $a_n$ at step S630, and the detector 506 calculates a $R_{aa}$ using the delayed input data $a_{n-1}$ and the input data $a_n$ at step S640. Here, $R_{aa}$ is $|Re\{a_n \times a_{n-1}^*\}|$.

At step S650, the detector 506 compares the calculated $R_{aa}$ with a predetermined threshold value. If the predetermined threshold value is smaller than the calculated $R_{aa}$, the detector 506 increases a first control variable k at step S660. Here, the first control variable k is a variable for controlling calculating times when a predetermined condition of correlation of the input data is met. After increasing the control variable k, step S680 is performed.

At step S680, the detector 506 compares the first control variable k with a second control variable K which is a variable for controlling calculation times of a minimum condition for determining a HT signal. If the control variable k is not greater than and not equal to the second control variable K, step S690 is performed. If the control variable k is greater than and equal to the second control variable K, at step S681, the detector 506 determines that the input data as a HT signal. Here, the input data is symbols arranged at the frequency domain.

At step S690, the detector 506 compares the variable n with a variable N−1 which denotes the number of subcarriers to be used for detecting a HT signal among OFDM subcarriers of the HT-SIG field. If the variable n is greater than the variable N−1, at step S691, the detector 506 determines that the input data is the legacy signal. If not, the step S610 is performed again.

Figure 7:
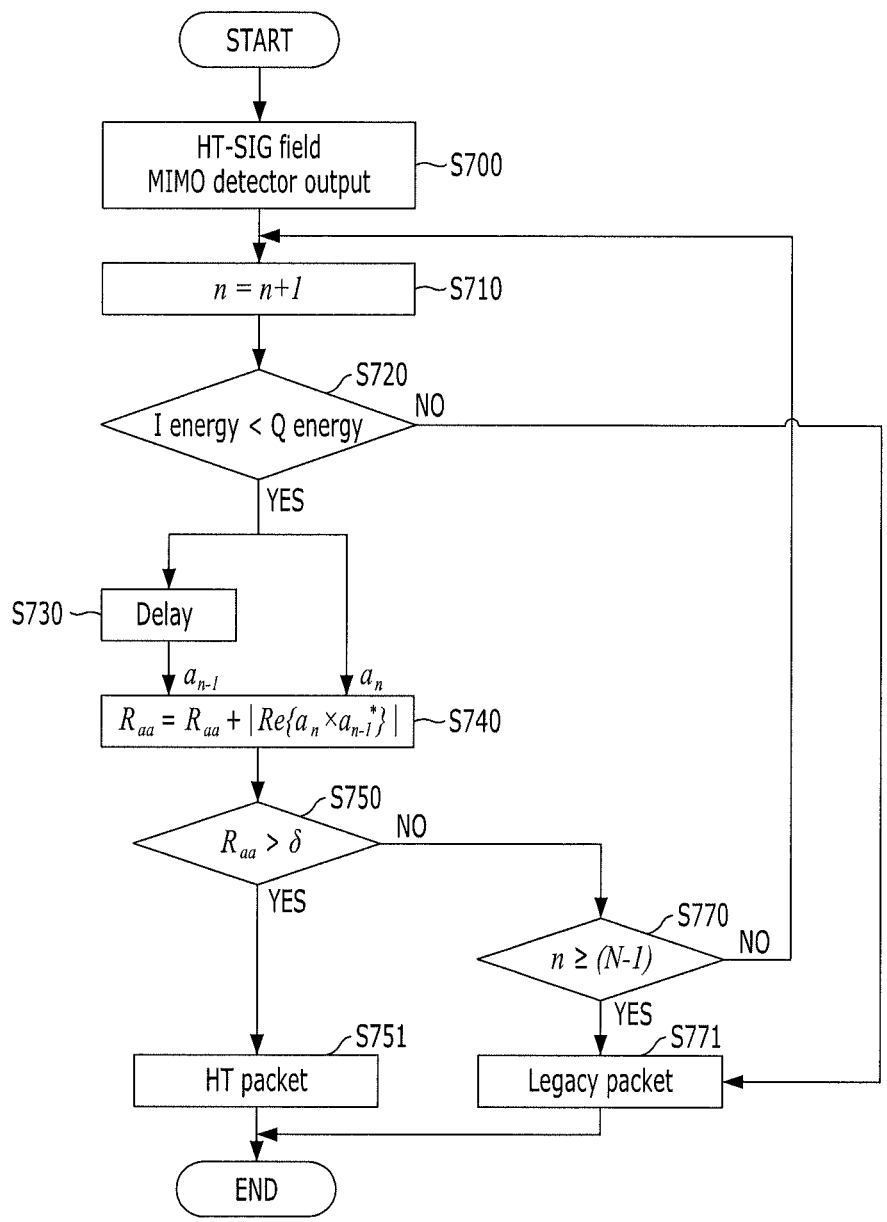
FIG. 7 is a flowchart illustrating a method for detecting a HT signal by calculating and accumulating a plurality of calculating results of $|\text{Re}\{a_n \times a_k^*\}|$ in a wireless communication system in accordance with an embodiment of the present invention.

FIG. 7 is a flowchart illustrating a method for detecting a HT signal by calculating and accumulating a plurality of calculating results of $|Re\{a_n \times a_k^*\}|$ in a wireless communication system in accordance with an embodiment of the present invention.

Referring to FIG. 7, the detector 506 increases a variable n for controlling times of calculating correlation of input data at step S700. For example, the detector 506 receives input data $a_1$, $a_2$, $a_3$, and $a_4$ from a MIMO detector and calculates correlations of the input data. Using the input data, the detector 506 extracts six correlations $(a_1 \times a_2^*)$, $(a_1 \times a_3^*)$, $(a_1 \times a_4^*)$, $(a_2 \times a_3^*)$, $(a_2 \times a_4^*)$, and $(a_3 \times a_4^*)$. For example, the variable n for controlling the correlation calculating times becomes 6.

At step S710, the detector 506 includes the variable n. At step S720, the detector 506 determines whether symbols arranged at a frequency domain are concentrated to an I-phase axis or concentrated to a Q-phase axis by comparing the I-phase component with the Q-phase component.

If the signals are more concentrated to the I-phase axis, the symbols arranged at the frequency domain are determined as the HT-SIG field. If the signals are more concentrated to the Q-phase axis, the symbols arranged at the frequency domain are determined as the L-SIG field. However, the HT-SIG cannot be accurately detected by only comparing signal amplitudes between the I-Phase and Q-phase.

Therefore, the detector 506 delays the input data $a_n$ at step S730. At step S740, the detector 506 calculates $R_{aa}$ using the delayed input data $a_{n-1}$ and the current input data $a_n$. Here, $R_{aa}$ is a result of $R_{aa}+|Re\{a_n \times a_{n-1}^*\}|$. At step S750, the detector 506 compares the $R_{aa}$ with a minimum correlation accumulation value δ of input data for HT-SIG detection.

If the $R_{aa}$ is greater than δ, at step S751 the input data is determined as the HT signal. If not, the detector 506 compares the variable n with a variable N−1 which denotes the number of subcarriers to be used for HT detection among OFDM subcarriers of the HT-SIG field at step S770. If the variable n is greater than the variable N−1, at step S771, the input data is determined as the legacy signal. If not, the step S710 is performed again, thereby repeating the above described procedure.

As described above, the HT signal is detected using correlation between input OFDM symbols among OFDM symbols in a wireless communication system in accordance with an embodiment of the present invention. Therefore, the detection error can be reduced.

While the present invention has been described with respect to the specific embodiments, it will be apparent to those skilled in the art that various changes and modifications may be made without departing from the spirit and scope of the invention as defined in the following claims.

What is claimed is:

1. An apparatus for detecting a signal, comprising:
a radio frequency (RF) unit configured to arrange a plurality of symbols received through an antenna at a frequency domain;
an analog to digital (AD) converter configured to convert the plurality of symbols arranged at the frequency domain to digital symbols;
a fast Fourier transform (FFT) unit configured to transform the digital symbols through a fast Fourier transform scheme;
a compensator configured to compensate a gain mismatch between an I-channel and a Q-channel of the transformed digital symbols;
a mapping unit configured to map the compensated digital symbols to a constellation diagram; and
a detector configured to calculate correlation results between at least two mapped symbols, extract the calculated correlation results, and detect a high throughput (HT) signal using the calculated correlation results.

2. The apparatus of claim 1, wherein the symbols are included in 48 data subcarriers of orthogonal frequency division multiplexing symbols.

3. An apparatus for detecting a signal, comprising:
a radio frequency (RF) unit configured to arrange a plurality of symbols received through an antenna at a frequency domain;
an analog to digital (AD) converter configured to converts the plurality of symbols arranged at the frequency domain to digital symbols;
a fast Fourier transform (FFT) unit configured to transform the digital symbols through a fast Fourier transform scheme;
a compensator configured to compensate a gain mismatch between an I-channel and a Q-channel of the transformed digital symbols;
a mapping unit configured to the compensated digital symbols to a constellation diagram; and
a detector configured to correlate the mapped symbols, extract correlation results, and detect a high throughput (HT) signal using the extracted correlation results,
wherein the detecting of the HT signal comprises comparing a real value of a first symbol included in at least one of the correlation results with an imaginary value of the first symbol.

4. The apparatus of claim 3, wherein the detecting of the HT signal further comprises comparing a real value of a second symbol included in at least one of the correlation results with an imaginary value of the second symbol.

5. The apparatus of claim 4, wherein the detector determines that the symbols are a HT signal when the real values of the first and second symbols are greater than the imaginary values of the first and second symbols.

6. The apparatus of claim 4, wherein the detector determines that the symbols are a legacy signal when the real values of the first and second symbols are smaller than the imaginary values of the first and second symbols.

7. A method for detecting a signal in a wireless communication system, comprising:
arranging a plurality of symbols received through an antenna;
converting the plurality of arranged symbols to digital symbols;
transforming the digital symbols using a fast Fourier transform scheme;
compensating a gain mismatch between an I-channel and a Q-channel of the transformed symbols;
mapping the compensated symbols to a constellation diagram; and
calculating correlation results between at least two mapped symbols, extracting the calculated correlation results, and detecting a high throughput (HT) signal using the calculated correlation results.

8. The method of claim 7, wherein the symbols are included in 48 data subcarriers of orthogonal frequency division multiplexing symbols.

9. A method for detecting a signal in a wireless communication system, comprising:
- arranging a plurality of symbols received through an antenna;
- converting the plurality of arranged symbols to digital symbols;
- transforming the digital symbols using a fast Fourier transform scheme;
- compensating a gain mismatch between an I-channel and a Q-channel of the transformed symbols;
- mapping the compensated symbols to a constellation diagram; and
- correlating the mapped symbols, extracting correlation results, and detecting a high throughput (HT) signal using the extracted correlation results,
- wherein the detecting the HT signal includes comparing a real value of a first symbol included in at least one of the correlation results and an imaginary value of the first symbol.

10. The method of claim 9, wherein the detecting the HT signal includes comparing a real value of a second symbol included in at least one of the correlation results and an imaginary value of the second symbol.

11. The method of claim 10, wherein in the detecting the HT signal, the symbols are determined as a HT signal when the real values of the first and second symbols are greater than the imaginary values of the first and second symbols.

12. The method of claim 10, wherein in the detecting the HT signal, the symbols are determined as a legacy signal when the real values of the first and second symbols are smaller than the imaginary values of the first and second symbols.

* * * * *